United States Patent [19]

Schmidt et al.

[11] 4,229,561
[45] Oct. 21, 1980

[54] POLYUREA POLYMER PREPARED FROM POLYETHERS HAVING HETEROCYCLIC GROUPS AND TERMINAL AMINO GROUPS

[75] Inventors: Oskar Schmidt, Kittsee; Walter Sibral, Tulln, both of Austria

[73] Assignee: Lim-Holding, S.A., Luxembourg, Luxembourg

[21] Appl. No.: 29,961

[22] Filed: Apr. 13, 1979

Related U.S. Application Data

[60] Continuation-in-part of Ser. No. 965,140, Nov. 29, 1978, which is a division of Ser. No. 735,282, Oct. 26, 1976, Pat. No. 4,139,706.

[51] Int. Cl.³ .............................................. C08G 18/32
[52] U.S. Cl. .......................................... 528/68; 528/73; 548/305
[58] Field of Search ........................... 528/68, 73

[56] References Cited

U.S. PATENT DOCUMENTS

| | | | |
|---|---|---|---|
| 3,808,250 | 4/1974 | Blahak et al. | 528/68 |
| 3,817,940 | 6/1978 | Blahak et al. | 528/68 |
| 4,129,741 | 12/1978 | Schmidt et al. | 528/68 |
| 4,153,801 | 5/1979 | Schmidt et al. | 528/68 |

Primary Examiner—Maurice J. Welsh
Attorney, Agent, or Firm—Beveridge, DeGrandi, Kline & Lunsford

[57] ABSTRACT

New polyurea polymer compositions are disclosed which are prepared by a polyaddition reaction of a polyisocyanate with a compound having the general formula:

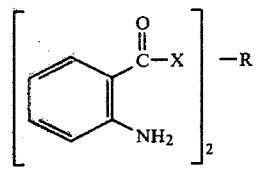

wherein X is oxygen or sulfur and R represents a group of the formula:

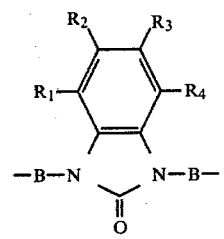

wherein $R_1$ to $R_4$ are hydrogen or halogen and B stands for a divalent polyalkylene ether group or a polyalkylene thioether group such as it is obtained by removal of the hydroxyl or mercapto groups from a polyalkylene ether diol or from a polyalkylene thioether dithiol of a molecular weight of 100 to 15000. The polymer composition are useful for the formation of vehicle tires of all types including plastic components for parts of wheels, for conveyor belts, fasteners and shoe soles.

20 Claims, No Drawings

POLYUREA POLYMER PREPARED FROM POLYETHERS HAVING HETEROCYCLIC GROUPS AND TERMINAL AMINO GROUPS

REFERENCE TO RELATED APPLICATION

This application is a continuation-in-part of application Ser. No. 965,140 filed Nov. 29, 1978 which in turn is a division of Ser. No. 735,282 filed Oct. 26, 1976 now U.S. Pat. No. 4,139,706, issued Feb. 13, 1979, the entire disclosures of which are relied on herein.

The invention relates to novel poly(thio)ethers having terminal amino groups, a process for their production and their application, in particular in the production of polyureas showing increased thermal stability and improved tensile and structural strength.

It is known that polyureas possess a number of considerable advantages over polyurethanes of corresponding structure. Polyureas are obtained by reaction of polyisocyanates with polyamines. Suitable polyamines are particularly polyether polyamines of higher molecular weight. According to German Offenlegungsschrift No. 2,019,432, polyamines suitable for the production of such polyureas are obtained from aliphatic polyether polyols and isatoic acid anhydride.

It was found that the use of poly(thio)ether diamines having at least one heterocyclic nucleus in their molecule (center) leads to the obtention of polyureas which are far superior to those known in respect of thermal stability and tensile and structural strength.

The invention relates to novel compounds having terminal amino groups, said novel compounds being of the general formula

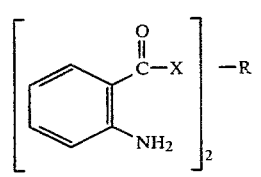

(I)

wherein X is oxygen or sulfur and R represents a group of the formula

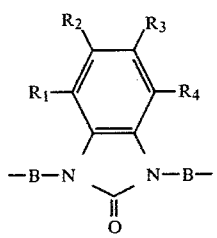

(II)

wherein $R_1$ to $R_4$ stand for hydrogen or halogen and B represents a divalent polyalkylene ether group or a polyalkylene thioether group such as it is obtained by removal of the hydroxyl or mercapto groups from a polyaklylene ether diol or a polyalkylene thioether dithiol of a molecular weight of 100 to 15000, in particular of 500 to 3000.

A further object of the invention is to provide a process for the production of the novel compounds of the formula I: These compounds are produced by heating a polyether diol or a polythioether dithiol of the formula III $$R(XH)_2 \quad \text{III}$$

wherein R and X have the meaning defined above, with at least two equivalents of isatoic acid anhydride in the presence of strong bases to temperatures of 30° to 150° C., preferably of 45° to 130° C. The reaction can be carried out with or without the presence of inert solvents. The amount of catalyst used can be varied within a wide range. Perferably, 1 to 10 parts by weight of the alkaline compound per 100 parts by weight of isatoic acid anhydride are used. The reaction is completed as soon as gas development ceases. The catalyst and excess isatoic acid anhydride are filtered off, optionally after addition of an inert solvent, and the final product is obtained with a high degree of purity after treatment with $CO_2$, shaking with water and drying in vacuo under stirring. For the majority of application purposes, simple filtration of the amino polyether under pressure suffices.

Suitable starting materials for the process according to the invention are polyether diols of the formula III of a molecular weight of about 300 to 15000, preferably about 1000 to 10000 which are obtained by reaction of tetrahydrofurane or of tetrahydrofurane and ethylene oxide or of tetrahydrofurane and propylene oxide with a compound corresponding to the group R of the formula II wherein B is hydrogen, $CH_2CH_2OH$ or $CH_2CH(CH_3)OH$.

Preferred are compounds of the general formula I, or the production of these compounds, wherein R represents a group of the formula

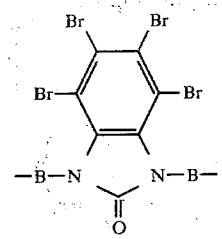

wherein B has the meaning defined above.

Further compounds favourable in respect of their application are such diamines of the formula I wherein B stands for a polyethylene ether group, a polypropylene ether group or a polyalkylene ether group containing ethylene ether groups and propylene ether groups in any given sequence. B can further represent a group containing ether groups as well as thioether groups.

In view of inexpensive starting materials, compounds of the formula I, or the production thereof, are favourable wherein B stands for a polyalkylene ether group derived from tetrahydrofurane, a polyalkylene ether group containing ethylene ether groups and alkylene ether groups derived from tetrahydrofurane in any given sequence or a polyalkylene ether group containing alkylene ether groups derived from tetrahydrofurane and propylene ether groups, in any given sequence.

Typical examples for the new compounds of the formula I according to the present invention and obtainable according to the process of the invention are the following:

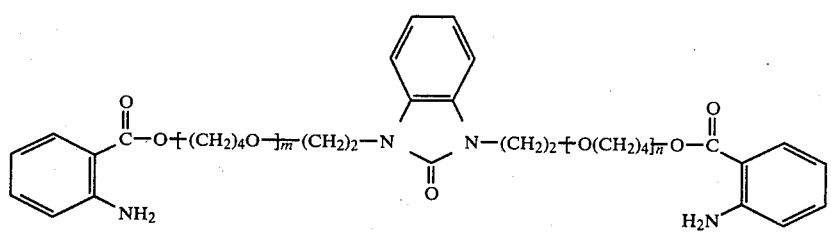
(1)
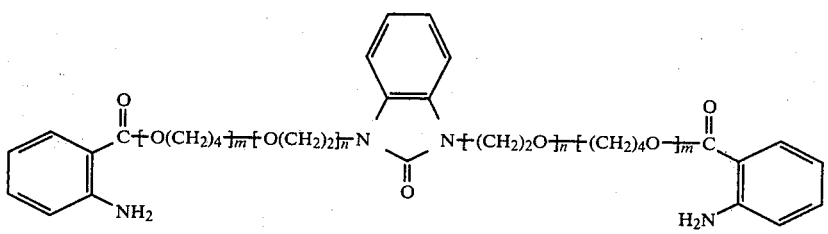
(2)
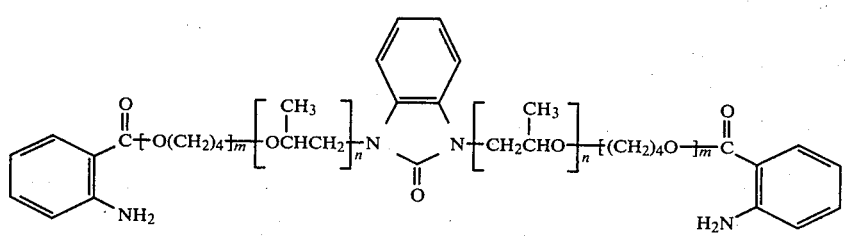
(3)
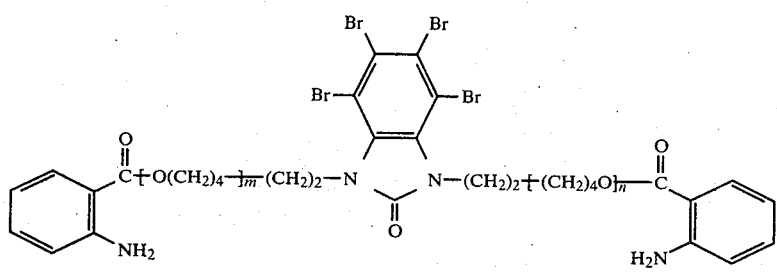
(4)
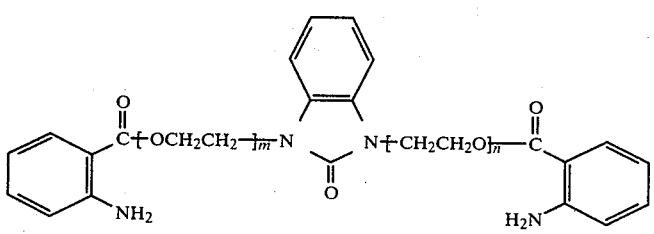
(5)
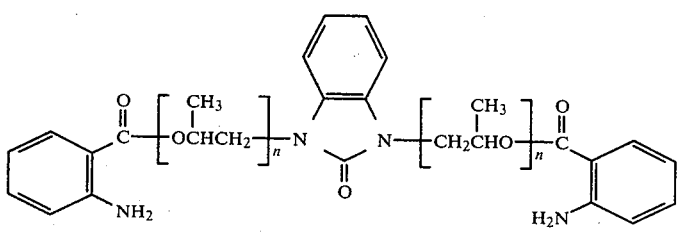
(6)
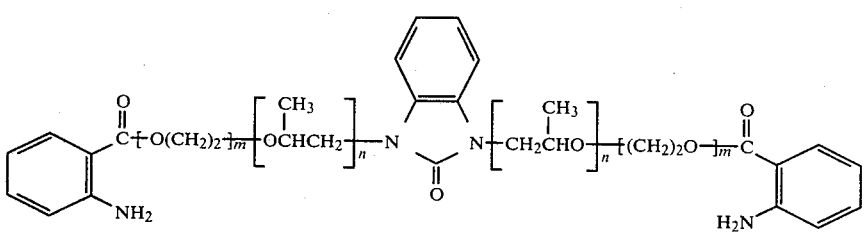
(7)

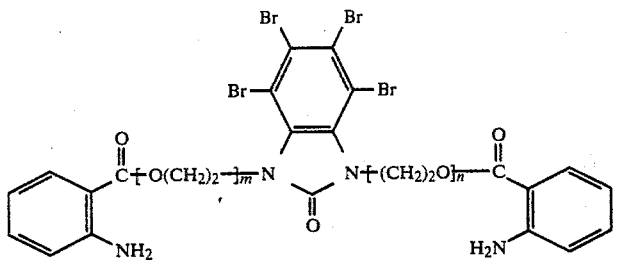

(8)

In these formulae and in the formulae contained in the Examples, the indices m and n in each case represent such integers that molecular weights of about 500 to 15,000 are obtained in the compounds.

A further object of the invention is the application of the diamines of the general formula I as reactants with polyisocyanate in the production of plastic materials according to the isocyanate polyaddition process.

The production of plastic materials from the new compounds according to the invention or produced according to the invention in the isocyanate polyaddition process can be effected in any given manner conventional in polyurethane chemistry, i.e. employed in the reaction of polyhydroxyl compounds with polyisocyanates. This means that the reaction of the new compounds with polyisocyanates can be carried out in the presence of all the additives known in polyurethane chemistry, such as catalysts, flame-retarding substances, and the like.

In the production of plastic materials in the form of elastomers with a high modulus of elasticity, the polyadducts have preferably been obtained up to now in the presence of low molecular aromatic diamines as chain extenders. Since these diamines are carcinogenic, their use is encountering objections of a physiological nature. When employing the compounds according to the invention, the use of low molecular aromatic diamines can be completely omitted in the production of elastomeric plastic materials of high modulus of elasticity, so that the hazard of employing carcinogenic substances is eliminated.

Suitable polyisocyanates for the production of polyadducts emplyoing the new compounds of the present invention are all polyisocyanates known in the polyurethane chemistry, i.e., for instance, tetramethylene diisocyanate, hexamethylene diosocyanate, 2,4-diisocyanatotoluene, 2,4-diisocyanatotoluene, mixtures of these isomers, 4,4-diisocyanato diphenyl methane or the like.

As already mentioned, the polyadducts produced under application of the new compounds according to the invention possess considerable advantages over polyurethanes of corresponding structure, particularly high stability, abrasion and wear resistance and thermal stability, as well as elasticity.

The production of the compounds of the formula I is described in the following by means of Examples:

EXAMPLE 1

108.6 g (0.1 mol) of a compound of the formula

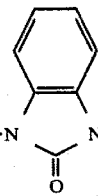
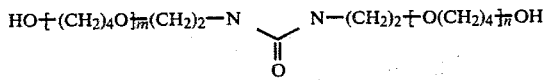

wherein m and n are integers, 35.9 g (0.22 mol) of isatoic acid anhydride and 2.5 g powdered sodium hydroxide are heated for 3 hours to 75° C. and then briefly to 110° C. After cooling, 150 ml methylene chloride are added and the mixture obtained is filtered. For complete removal of the sodium hydroxide, 200 ml water are added to the filtrate and $CO_2$ is introduced. After three extractions with 200 ml water each, the organic phase is concentrated in vacuo. This procedure yields 123.2 g (93% of the theory, which means that 93% of all OH-groups have reacted with isatoic acid anhydride) of a honey-coloured, viscous substance.

Amine titration: for 2.7358 g substance: 41.5 ml; 0.1 n $HClO_4$ in glacial acetic acid.

EXAMPLE 2

117.4 g (0.1 mol) of a compound of the formula

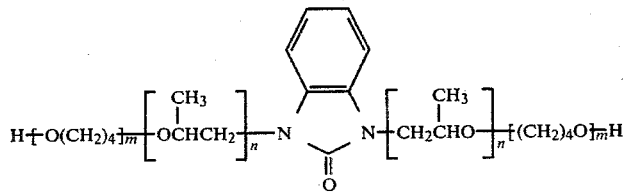

wherein m and n are integers, 35.9 g (0.22 mol) of isatoic acid anhydride and 2 g powdered sodium hydroxide are heated for 3 hours to 80° C. and for 30 minutes to 110° C. and the mixture obtained is treated in analogy to Example 1. This procedure yields 138.6 g (96% of the theory) of a honey-coloured, viscous substance.

Amine titration: for 1.5732 g substance: 23.2 ml; 0.1 n $HClO_4$ in glacial acetic acid.

EXAMPLE 3

154.5 g (0.1 mol) of a compound of the formula

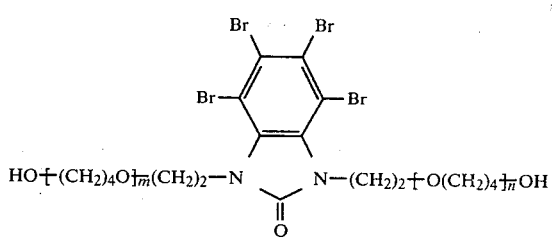

wherein m and n are integers, 35.9 g (0.22 mol) of isatoic acid anhydride and 2.5 g powdered sodium hydroxide are heated for 4 hours to 75° C. and for 15 minutes to 110° C. and the mixture thus obtained is treated in analogy to Example 1. The yield amounts to 166.0 g (93% of the theory) of a honey-coloured, viscous substance.

Amine titration: for 1.3474 g substance: 15.3 ml; 0.1 n $HClO_4$ in glacial acetic acid.

EXAMPLE 4

127.8 g (0.1 mol) of a compound of the formula

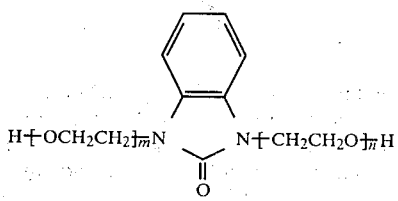

wherein m and n are integers, 36 g of isatoic acid anhydride and 2.5 g powdered sodium hydroxide are heated for 3 hours to 75° C. and for 15 minutes to 110° C. After cooling, 150 ml methylene chloride are added and the mixture is filtered. For complete removal of the sodium hydroxide, 200 ml water are added and $CO_2$ is introduced. After three extractions with 200 ml water each, the organic phase is concentrated in vacuo. This procedure yields 142.5 g (94% of the theory) of a honey-coloured, viscous substance.

Amine titration: for 1.8452 g substance: 24.5 ml 0.1 n $HClO_4$ in glacial acetic acid.

EXAMPLE 5

106.2 g (0.1 mol) of a compound of the formula

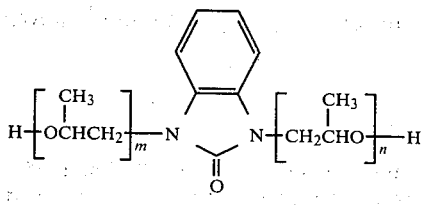

wherein m and n are integers, 35.9 g of isatoic acid anhydride and 3.0 g powdered sodium hydroxide are heated for 3 hours to 90° C. for 15 minutes to 110° C., and the mixture is treated according to Example 4. This procedure yields 118.3 g (91% of the theory) of a honey-coloured, viscous substance.

Amine titration: for 2.2463 g substance: 34.7 ml; 0.1 n $HClO_4$ in glacial acetic acid.

EXAMPLE 6

177 g (0.1 mol) of a compound of the formula

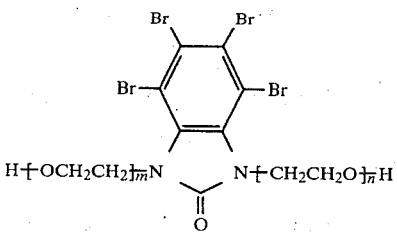

wherein m and n are integers, 35.9 g of isatoic acid anhydride and 2.0 g powdered sodium hydroxide are heated for 3 hours to 75° C. and for 1 hours to 110° C. and the mixture obtained is treated according to Example 4. This procedure yields 188.8 g (94% of the theory) of a honey-coloured, viscous substance.

Amine titration: for 1.2653 g substance: 12.7 ml; 0.1 n $HClO_4$ in glacial acetic acid.

EXAMPLE 7

96.6 g (0.1 mol) of a compound of the formula

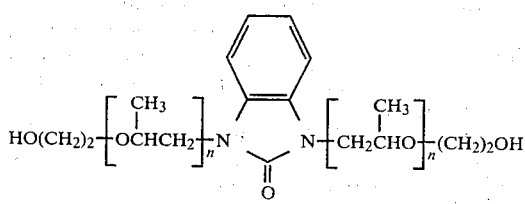

wherein n is an integer, 35.9 g of isatoic acid anhydride and 10.0 g powdered sodium hydroxide are heated for 4 hours to 80° C. and then for 1 hour to 110° C. and treated in analogy to Example 4. This procedure yields 898 g (88% of the theory) of a honey-coloured, viscous substance.

Amine titration: for 6.9415 g substance: 12.2 ml 0.1 n $HClO_4$ in glacial acetic acid. (89.7% of the theory), which means that 89.7% of all OH-groups have reacted with isatoic acid anhydride.

The application of the compounds of the formula I is explained in detail by means of the following Examples:

EXAMPLE 8

264.8 g (0.2 mol) of the compound produced in Example 1 and 37 g toluylene diisocyanate (80% 2,4-isomer, 20% 2,6-isomer) are mixed, poured into a mould and then first heated to 60° C. for 30 minutes and then to 100° C. for 24 hours. This yields an elastomer of excellent mechanical properties.

| | |
|---|---|
| Tensile strength: | 280 kp cm$^{-2}$ |
| Structural strength: | 45 kp cm$^{-1}$ |
| Shore hardness DIN 53505 | 50 |

EXAMPLE 9

288.8 g (0.2 mol) of the compound aproduced according to Example 2 and 37 g toluylene diisocyanate are heated in a mould for for 30 minutes to 60° C. and then for 24 hours to 100° C. This yields an elastomer of excellent mechanical properties.

| | |
|---|---|
| Tensile strength: | 260 kp cm$^{-2}$ |
| Structural strength: | 48 kp cm$^{-1}$ |
| Shore hardness DIN 53505 | 56 |

EXAMPLE 10

151.6 g (0.1 mol) of the compound produced according to Example 4 and 18.5 g toluylene diisocyanate (80% 2,4-isomer, 20% 2,6-isomer) are mixed, poured into a mould and then heated for 1 hour to 60° C. and for 24 hours to 100° C. This yields an elastomer of excellent mechanical properties.

| | |
|---|---|
| Tensile strength: | 280 kp cm$^{-2}$ |
| Structural strength: | 48 kp cm$^{-1}$ |
| Shore hardness DIN 53505: | 52 |

EXAMPLE 11

130 g (0.1 mol) of the compound produced according to Example 5 and 18.5 g toluylene diisocyanate are heated in a mould first for 30 minutes to 60° C. and then for 24 hours to 100° C. This yields an leastomer of the following physical data:

| | |
|---|---|
| Tensile strength: | 270 kp cm$^{-2}$ |
| Structural strength: | 46 kp cm$^{-1}$ |
| Shore hardness DIN 53505: | 54 |

EXAMPLE 12

200.1 g (0.132 mol) of the compound produced according to Example 4 are reacted at 60°–70° C. with 37 g toluylene diisocyanate. After 15 minutes, the temperature is raised to 90° C. under water jet vacuum. At this temperature, 11.8 g melted 1,4-dichloro-3,5-diaminobenzene are added and the mixture is poured into a preheated mould. An elastomer of excellent mechanical properties is obtained.

| | |
|---|---|
| Tensile strength: | 300 kp cm$^{-2}$ |
| Structural strength: | 42 kp cm$^{-1}$ |
| Shore hardness DIN 53505 | 50 |

EXAMPLE 13

130 g (0.1 mol) of the compound produced according to Example 5 to which 42.5 (0.245 mol) toluylene diisocyanate (80% 2,4-isomer, 20% 2,6-isomer) have been added are stirred for 1 hour at a temperature of 50°–60° C.

Then, the temperature is raised to 90° C., 22.9 g 1,4-dichloro-3,5-diaminobenzene are added and the mixture is poured into a mould. It is heated for 24 hours and this procedure yields an elastomer of the following properties:

| | |
|---|---|
| Tensile strength: | 240 kp cm$^{-2}$ |
| Structural strength: | 42 kp cm$^{-1}$ |
| Shore hardness DIN 53505: | 50 |

EXAMPLE 14

130 g (0.1 mol) of the diamine produced according to Example 5, to which 61.25 g (0.245 mol) of 4,4-diisocyanate diphenyl methane have been added, are stirred for 1 hour at a temperature of 50°–60° C. Then the temperature is raised to 90° C., 22.9 g of 1,4-dichloro-3,5-diaminobenzene are added and the mixture is poured into a mould. After heating for 24 hours, an elastomer of the following properties is obtained:

| | |
|---|---|
| Tensile strength: | 380 kp cm$^{-2}$ |
| Structural strength: | 58 kp cm$^{-1}$ |
| Shore hardness DIN 53505: | 55 |

The polymer compositions described herein and defined by the following claims can be used in the formation of vehicle tires of all types as well as portions of vehicle tires such as plastic inserts for the chains of tractor vehicles, plastic linings for wheels, such as the pulleys of cable cars, plastic wheel rims for rail vehicles, conveyor belts, fasteners such as plastic pins and bolts as well as shoe soles.

We claim:

1. Plastic materials produced according to the isocyanate polyaddition process by reacting compounds having terminal amino groups, said compounds being of the general formula

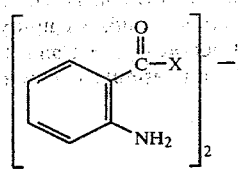

wherein X is oxygen or sulfur and R represents a group of the formula

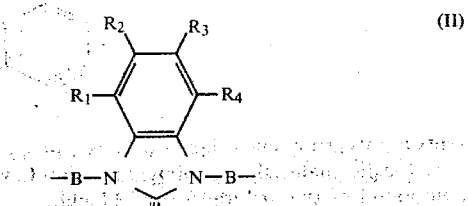

wherein $R_1$ and $R_4$ are hydrogen and halogen and B stands for a divalent polyalkylene ether group or a polyalkylene thioether group obtained by removal of the hydroxyl or mercapto groups from a polyalkylene ether diol or from a polyalkylene thioether dithiol of a molecular weight of 100 to 15000, with a polyisocyanate.

2. Plastic material according to claim 1, wherein a compound of the general formula I, wherein B stands for a divalent polyalkylene ether group or a polyalkylene thioether group obtained by removal of the hydroxyl or mercapto groups from a polyalkylene ether diol or a polyalkylene thioether dithiol of a molecular weight of 500 to 3000, is employed.

3. Plastic material according to claim 1, wherein a compound of the general formula I, wherein R represents a group of the formula

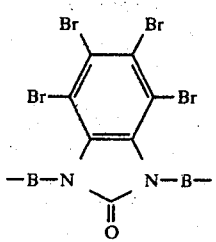

wherein B stands for a divalent polyalkylene ether group or a polyalkylene thioether group obtained by removal of the hydroxyl or mercapto groups from a polyalkylene ether diol or a polyalkylene thioether dithiol of a molecular weight of 100 to 15000, is employed.

4. Plastic material according to claim 1, wherein a compound of the general formula I, wherein B represents a polyethylene ether group, is employed.

5. Plastic material according to claim 1, wherein a compound of the general formula I, wherein B represents a polypropylene ether group, is employed.

6. Plastic material according to claim 1, wherein a compound of the general formula I, wherein B represents a polyalkylene ether group containing ethylene ether groups and propylene ether group in any given sequence, is employed.

7. Plastic material according to claim 1, wherein a compound of the general formula I, wherein B represents a group containing ether groups as well as thioether groups, is employed.

8. Plastic material according to claim 1, wherein a compound of the general formula I, wherein B represents a polyalkylene ether group derived from tetrahydrofurane, is employed.

9. Plastic material according to claim 1, wherein a compound of the general formula I, wherein B represents a poly-alkylene ether group containing ethylene ether groups and alkylene ether groups derived from tetrahydrofurane, in any given sequence, is employed.

10. Plastic material according to claim 1, wherein a compound of the general formula I, wherein B stands for a polyalkylene ether group containing alkylene ether groups derived from tetrahydrofurane, and propylene ether groups, in any given sequence, is employed.

11. Plastic material according to claim 1, wherein the compound of the formula

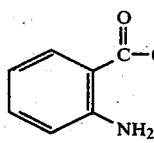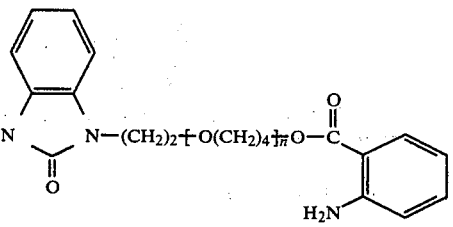

is employed, wherein m and n represent integers such that the molecular weight of said compound is from about 500 to 15,000.

12. Plastic material according to claim 1, wherein the compound of the formula

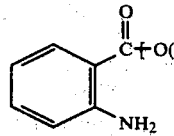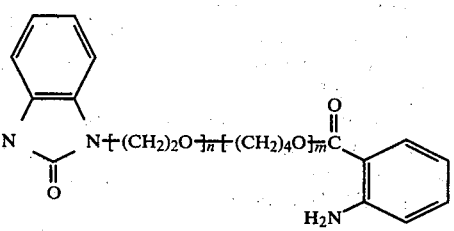

is employed, wherein m and n represent integers such that the molecular weight of said compound is from about 500 to 15,000.

13. Plastic material according to claim 1, wherein the compound of the formula

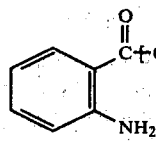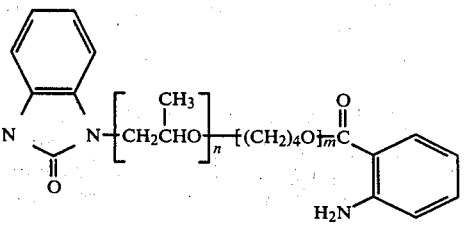

is employed, wherein m and n represent integers such that the molecular weight of said compound is from about 500 to 15,000.

14. Plastic material according to claim 1, wherein the compound of the formula

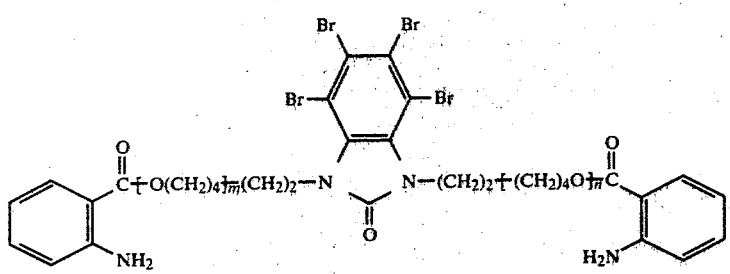

is employed, wherein m and n represent integers such that the molecular weight of said compound is from about 500 to 15,000.

15. Plastic material according to claim 1, wherein the compound of the formula

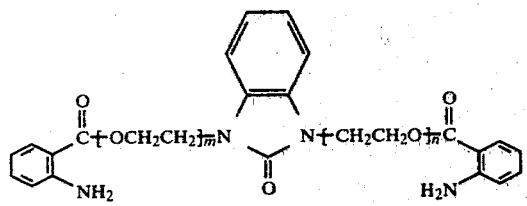

is employed, wherein m and n represent integers such that the molecular weight of said compound is from about 500 to 15,000.

16. Plastic material according to claim 1, wherein the compound of the formula

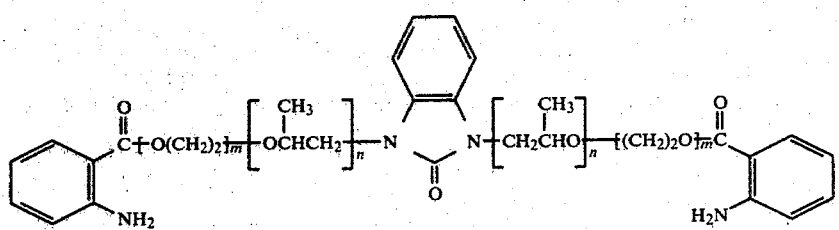

is employed, wherein m and n represent integers such that the molecular weight of said compound is from about 500 to 15,000.

17. Plastic material according to claim 1, wherein the compound of the formula

[structure]

is employed, wherein m and n represent integers such that the molecular weight of said compound is from about 500 to 15,000.

18. Plastic material according to claim 1, wherein the compound of the formula

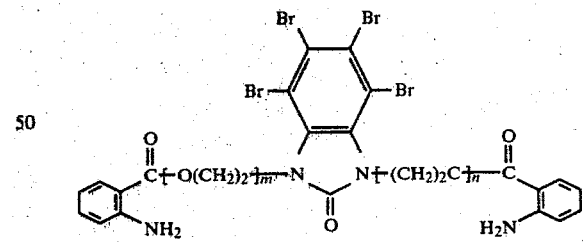

is employed, wherein m and n represent integers such that the molecular weight of said compound is from about 500 to 15,000.

19. A vehicle tire formed of the plastic material defined in claim 1.

20. A shaped article formed from the plastic material defined in claim 1.

* * * * *